(No Model.)
H. G. GEISTWITE.
BICYCLE CHAIN LOCK.
No. 543,547. Patented July 30, 1895.
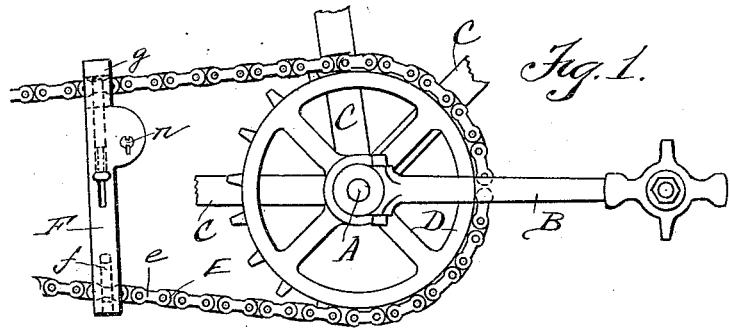
Fig. 1.
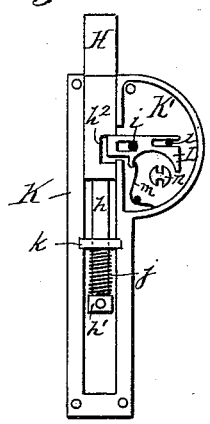
Fig. 5.
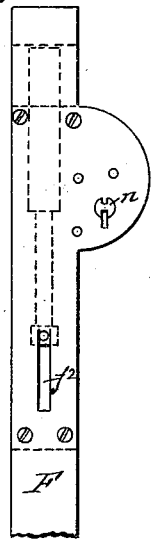
Fig. 2.
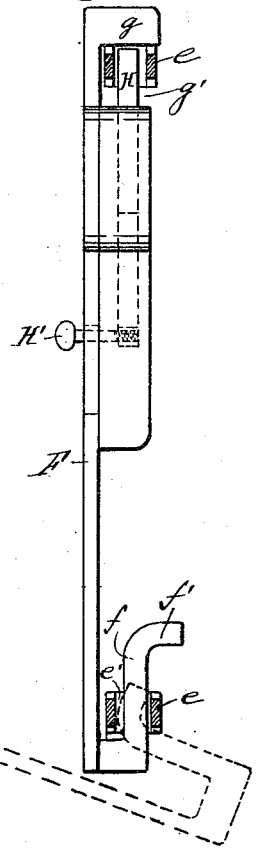
Fig. 3.
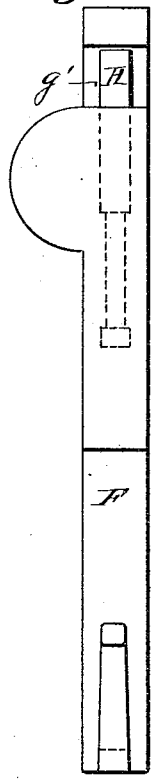
Fig. 4.
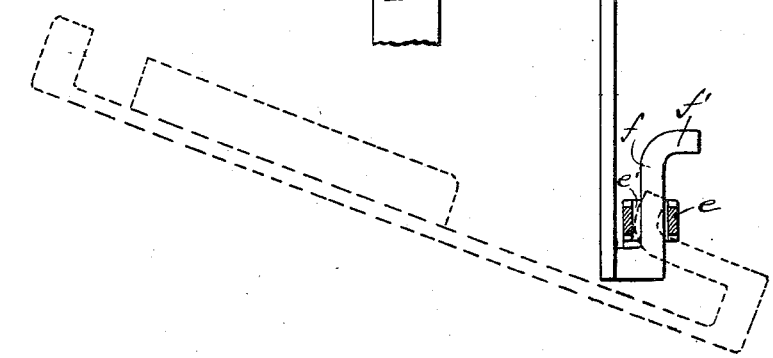
Witnesses
Daniel L. Adams
David Levan
Hiram Grant Geistwite
Inventor
By Attorney

UNITED STATES PATENT OFFICE.

HIRAM GRANT GEISTWITE, OF READING, PENNSYLVANIA.

BICYCLE-CHAIN LOCK.

SPECIFICATION forming part of Letters Patent No. 543,547, dated July 30, 1895.

Application filed December 1, 1894. Serial No. 530,560. (No model.)

*To all whom it may concern:*

Be it known that I, HIRAM GRANT GEISTWITE, a citizen of the United States, residing at Reading, county of Berks, State of Pennsylvania, have invented certain Improvements in Bicycle-Chain Locks, of which the following is a specification.

My invention relates to that class of locks for chain-driven vehicles—such as bicycles— in which the wheel is secured against turning by means of a device engaging the upper and lower parts of the chain between the sprocket-wheels, so as to prevent any effective movement of the chain. Devices for this purpose have been heretofore employed consisting, essentially, of a headed bar or shaft adapted to pass through opposite spaces between the links of the chain and a lock to prevent its withdrawal. Such a device, however, lacks the necessary strength and rigidity when applied to the latter forms of chains, owing to the smallness of the space between the links, which unduly limits the size of the shaft or bar.

One object of my invention is to overcome this difficulty by employing a construction in which the main portion of the device may be made as large as desired independently of the size of the space.

A further object is to provide a novel device which will be easily applied and effective for the purpose intended.

The invention is fully described in connection with the accompanying drawings, and is specifically pointed out in the claims.

Figure 1 indicates a portion of a bicycle having my device applied thereto. Fig. 2 is a partial front elevation, Fig. 3 a side elevation, and Fig. 4 a rear elevation, of my improved device, Fig. 3 also showing the upper and lower parts of the chain in cross-section and indicating in dotted lines how the device is applied. Fig. 5 shows the lock mechanism separate.

Referring to Fig. 1, A represents the crank-shaft, B one of the cranks C C of the frame, and D the front sprocket-wheel, of a safety-bicycle, while E represents the driving-chain which passes to the driving-wheel of the machine.

My improved device is shown applied to the chain E, so as to prevent the turning of the driving-wheel, the manner of its application being described in connection with the other figure of the drawings.

A represents a plate or bar of any desired cross-section, the lower end of which is provided with a rigid hook-shaped portion $f$, the cross-section of which is somewhat less than the space $e'$ between the links $e e$ of the driving-chain, Fig. 3, while the other end is formed with a rigid head or shoulder $g$, adapted to overhang the chain E, as shown. The hook $f$ is further provided with an outward bend or shoulder $f'$. Secured to the inner face of the plate F is a lock-case K, the upper end of which is a sufficient distance below the head $g$ to form a recess $g'$, opening inwardly and large enough to easily admit the chain E. This lock is provided with a sliding bolt H, the shank of which passes through a fixed washer $k$ and is provided with a spring $j$ and suitable means, as button H', projected through a slot $f^2$ in the plate F, for sliding the bolt outward against the force of said spring. The bolt is also provided with a notch $h^2$, which is automatically engaged, when the bolt is projected a proper distance beyond the case, by a series of tumblers L, guided upon pins $i\,i$, and normally pressed against the bolt by a corresponding series of springs $m$, the said tumblers being withdrawn, so as to permit the automatic retraction of the bolt by means of a properly-formed key applied at $n$.

The hooked end of the device is first engaged with one part of the chain in the manner indicated by the dotted lines in Fig. 3, and the opposite part of the chain is then entered in the recess $g'$, which is open to receive it, the bolt H being normally held in retracted position by the spring $g$. The bolt is then pushed outward by means of the button H', the end of it passing through the space between the links until the tumblers engage the notch $h$ and hold the bolt in its projected position. The part of the chain engaged by the hook $f$ cannot be raised out of engagement therewith, no matter how much slack there may be in the chain, owing to the bend or shoulder $f'$. The removal of the device is thus effectually prevented, except by means of a key adapted to operate all the tumblers L, so as to release the bolt.

It will be seen that with my improved construction I am enabled to make the main portion of the device of any desired strength, only the cross-section of the hook $f$ and of the projecting portion of the bolt H being limited by the size of the interstices of the chain. No separate part, such as a padlock, is employed. The device is applied with the greatest facility without the use of a key, and is so strongly and securely attached as to practically prevent its removal, except by means of the proper key.

What I claim is—

1. A driving-chain lock for velocipedes comprising a bar or plate having one end formed with an open hook of smaller cross-section than said bar or plate to adapt the same to engage one part of the chain as described and the other end with a rigid shoulder or head, a sliding bolt arranged to engage the other part of the chain in connection with said shoulder, and a lock mechanism for said bolt, substantially as and for the purpose, set forth.

2. A driving-chain lock for velocipedes comprising a bar or plate having one end formed with a chain hook having a shoulder $f''$, and the other end with a chain recess $g'$ opening transversely, a sliding bolt adapted to enter said recess longitudinally and a lock for said bolt, substantially as and for the purpose set forth.

In testimony whereof I affix my signature in presence of two witnesses.

HIRAM GRANT GEISTWITE.

Witnesses:
JAMES PICKENS,
F. PIERCE HUMMEL.